United States Patent [19]

Walker et al.

[11] Patent Number: 4,717,098
[45] Date of Patent: Jan. 5, 1988

[54] ACTUATOR FOR A G-LIMITER OVERRIDE

[75] Inventors: Laurence A. Walker, Glencoe; William F. Stoudt, Florissant, both of Mo.

[73] Assignee: McDonnell Douglas Corporation, Long Beach, Calif.

[21] Appl. No.: 864,454

[22] Filed: May 19, 1986

[51] Int. Cl.⁴ ............................................. B64C 13/04
[52] U.S. Cl. .................................... 244/223; 244/234
[58] Field of Search .................... 244/75 R, 196, 197, 244/220, 221, 223, 230, 234, 236, 228

[56] References Cited

U.S. PATENT DOCUMENTS

| | | |
|---|---|---|
| 2,630,284 | 3/1953 | Feeney . |
| 2,638,289 | 5/1953 | McKellar et al. ................ 244/223 |
| 2,767,942 | 10/1956 | Lucien . |
| 2,849,198 | 8/1958 | Borngesser ........................ 244/223 |
| 2,876,967 | 3/1959 | Glenny . |
| 2,881,993 | 4/1959 | Browne .............................. 244/223 |
| 2,903,205 | 9/1959 | Borngesser et al. .............. 244/228 |
| 2,983,469 | 5/1961 | Marx ................................. 244/228 |
| 3,599,510 | 8/1971 | Scott et al. ........................ 74/625 |

*Primary Examiner*—Jeffrey V. Nase
*Assistant Examiner*—Rodney Corl
*Attorney, Agent, or Firm*—George W. Finch; Donald L. Royer; James M. Skorich

[57] ABSTRACT

Spring-loaded linkage contained in a housing attached to the control stick of an aircraft. One member of the linkage is an arm having an end projecting from the housing and forming a hand grip through which the pilot controls the aircraft. The linkage provides a resisting force on the arm which prevents it from rotating relative to the control stick during normal flight maneuvers. However, when the control stick is pulled to full aft stop and additional pull equal to the spring break-out force is applied, the resisting force suddenly decreases, and the arm and grip rotate aft a discrete displacement relative to the control stick. This displacement actuates a g-limiter override which permits the aircraft to exceed set limits on its normal acceleration. The discrete displacement also provides the pilot with a tactile signal that the override has been actuated. The g-limiter override condition can be maintained by a pull on the grip substantially less than the spring break-out force. When the pull on the grip drops below the override maintenance level, the resisting force rapidly increases back up to the spring break-out force. The arm and grip are then instantaneously rotated forward a discrete displacement relative to the control stick. This forward displacement deactivates the g-limiter override and provides the pilot with a tactile signal that the g-limiter override has been deactivated.

18 Claims, 6 Drawing Figures

ACTUATOR FOR A G-LIMITER OVERRIDE

BACKGROUND OF THE INVENTION

1. Field of the Invention

This invention relates to aircraft flight controls and, more particularly, to actuating an apparatus which overrides a part of the flight control system of an aircraft.

2. Descripton of the Prior Art

Modern aircraft are equipped with electrical flight control (also known as "fly-by-wire") systems which do not translate high aerodynamic hinge moments or loads directly into a proportionally high force acting on the control stick. As a result, a pilot is physically able to command control surface deflections which will generate normal acceleration capable of causing structural failure of the aircraft or black-out of the pilot. To guard against this danger, the flight control systems incorporated into the current generation of aircraft include a g-limiter which prevents the pilot from commanding normal g's in excess of a predetermined level of safety. However, situations can arise where the pilot may choose to exceed the design limit load of his aircraft by commanding additional normal g's in order to avoid crashing into the ground or colliding with another aircraft, or to evade a hostile aircraft or missile.

In order to provide the pilot with such an option, modern flight control systems include an override for the g-limiter that can be actuated by the pilot. The ultimate strength of the aircraft at which structural failure will occur is typically 150% of the design limit load. Thus additional g's in excess of the design limit load, but still short of the ultimate strength, are available for such emergencies.

One apparatus currently used to actuate a g-limiter override is comprised of a paddle switch located on the control stick. The switch is electrically connected to g-limiter override circuitry contained in the flight control computer. In order to actuate the g-limiter override, the fifth digit (pinky finger) of the gloved hand that is gripping the control stick must be extended and hooked around a rotatable paddle, and the paddle must then be pulled towards the control stick. This maneuver requires unusual dexterity or the use of a second hand. In an emergency high-g situation, the condition typically extant when it might be necessary to override the g-limiter, the g's hinder the pilot from extending his fifth digit and from pulling the paddle, or from using a second hand. In contrast to the movement necessary to operate the foot brake in an automobile, the movement of the digit, and certainly the use of a second hand, are not reflexive actions, and thus pulling the paddle will require extra time even under optimal circumstances.

The use of hydraulics in an attempt to solve the problem is exemplified by U. S. Patent No. 2,849,198: "Hydraulic Force-Limiter for Aircraft Controls," issued on Aug. 26, 1958, to Otto J. Borngesser. When the aircraft is subjected to excessive g-forces, the disclosed mechanism increases the resistance against movement of the control stick, with the resistance increasing proportionally with the g-forces. The invention includes a g-force limiter which can be overridden by the application of an abnormally large force on the control stick. The abnormally large force necessary to overcome the resistance must be continuously applied to the control stick in order to keep the override engaged, and thus hinders lateral stick movement during operation of the override as well as tiring the pilot.

Another approach is disclosed by U. S. Patent No. 2,903,205: "Electric 'G' Limiter for Aircraft", issued on Sept. 8, 1959 to Otto J. Borngesser and Alfred J. Monroe. This invention uses a magnetic clutch to generate a relatively high opposing or inhibiting force on the control stick when the movement of the control stick by the pilot would otherwise increase the structural load on the aircraft beyond the design limit load. When necessary, the pilot may overcome the g-limiter and continue movement of the control stick because the limiting torque output of the clutch is always less than the maximum force that can be applied by the operator. As in the case of the previously discussed hydraulic g-limiter, a resisting torque is continually applied by the magnetic clutch while the control system is operating in the override mode and thus similarly impedes lateral stick movement during operation of the override and tires the pilot.

SUMMARY OF THE INVENTION

The present invention is a spring-loaded linkage which is mechanically attached to a control stick. The pilot's hand grip forms the end of one member of the linkage. When the pilot has pulled the control stick towards himself to the limit of its travel, that is, to the "full aft stick" position, additional pull on the grip is transmitted into the linkage. Further rotation of the grip about a pivot point on the linkage's housing is opposed by a moment generated by a pre-loaded spring. Upon the application of sufficient force to overcome the opposing spring moment, known as the "spring break-out force", the spring pivots about one end, causing a sudden decrease in the spring moment arm and, concomitantly, in the opposing spring moment. Since the pilot is still applying the spring break-out force, this sharp drop in the opposing spring moment affects a sudden rotation of the grip relative to the control stick about the pivot point on the linkage's housing. The rotation of the grip about the pivot point on the linkage's housing mechanically forces the closure of an electrical switch which actuates a g-limiter override, and the sudden, discrete displacement of the grip provides the pilot with a tactile signal that the g-limiter override has been actuated.

Because of the reduced spring moment, the applied force necessary to keep the g-limiter override engaged is reduced to a level slightly greater than the force initially required to pull the control stick to its full aft position. Thus lateral control stick movement is not unduly hindered and the pilot is not required to overly exert himself while the g-limiter override is engaged because it is not necessary to continuously apply an abnormally high force to the control stick. The g-limiter override is deactivated and the control stick and flight system returned to their normal operating mode upon a slight decrease in the force applied by the pilot from that required to keep the system in the override mode. A sudden discrete forward rotation of the grip about its pivot point on the linkage's housing provides the pilot with a tactile signal that the g-limiter override has been deactivated.

The present invention may be quickly and easily added to an existing control system by attaching it to the control stick.

It is an object of the present invention to allow the pilot to actuate the g-limiter override of a flight control system with an apparatus that will give him a distinct tactile signal upon its actuation as well as when the override is deactivated.

Another object of the present invention is to allow the pilot to actuate the g-limiter override with a body movement which is reflexive and which is not hindered by g forces.

Yet another object is to allow the pilot to keep the g-limiter override actuated without requiring him to continuously apply an abnormally large force on the control stick.

A further object of the present invention is to provide an actuator that can be easily added to a g-limiter override that is already installed on an aircraft.

PREFERRED EMBODIMENT OF THE PRESENT INVENTION

Figure 1:
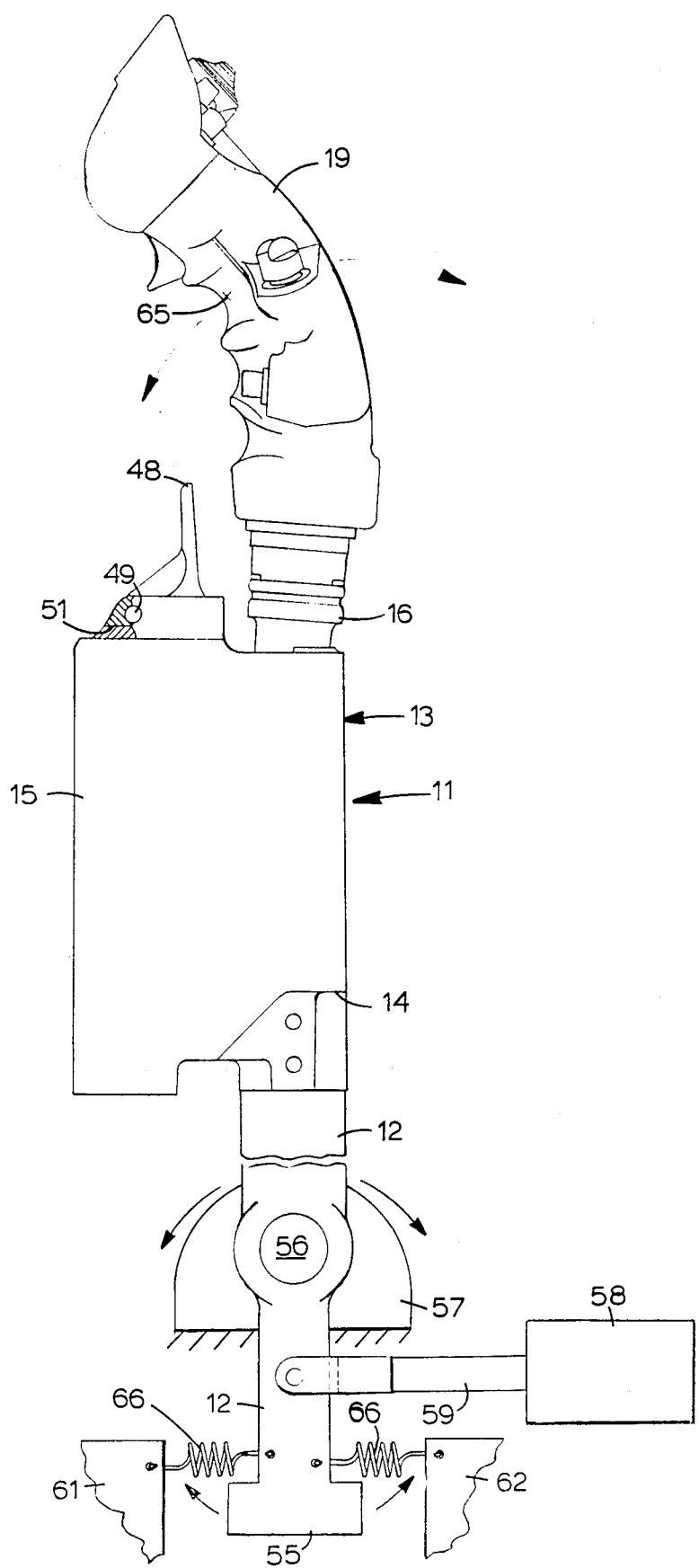
FIG. 1 is a side view of a control stick equipped with the preferred embodiment of the present invention.
Figure 2:
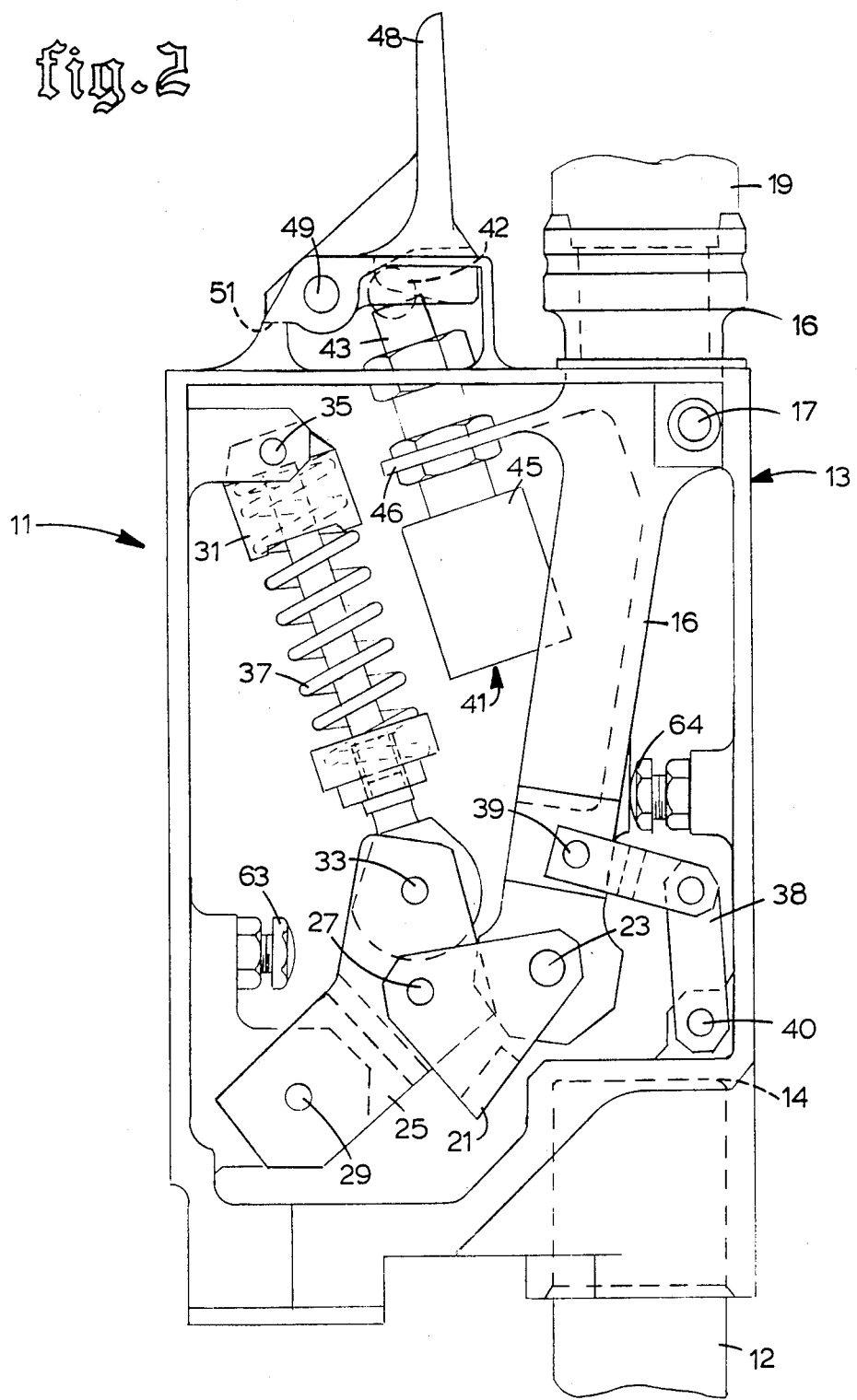
FIG. 2 is a side view of the preferred embodiment of the present invention and shows it operatively attached to a control stick. The cover plate has been deleted in order to show the working parts of the device. The embodiment is shown in the position in which the g-limiter override has not been actuated.
Figure 3:
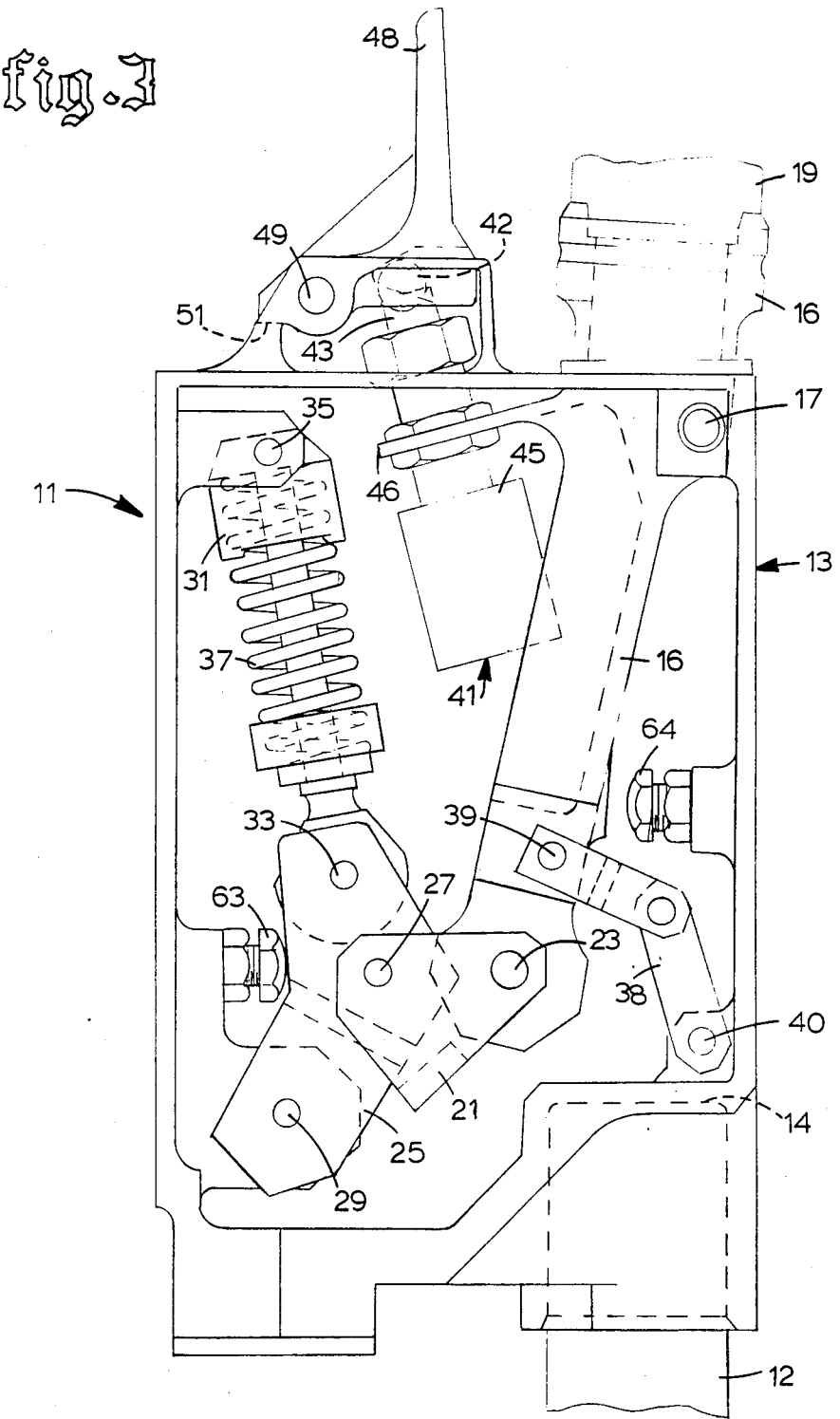
FIG. 3 is the same side view of the preferred embodiment of the invention without its cover plate as shown in FIG. 2, but positioned to actuate the g-limiter override.

Reference is now made to the drawings, and in particular to FIGS. 1, 2 and 3. FIG. 1 shows preferred embodiment 11 of the present invention mounted on control stick 12. FIGS. 2 and 3 are detailed illustrations of preferred embodiment 11 in the positions in which the g-limiter override is not actuated and in which it is actuated, respectively. Preferred embodiment 11 is essentially a spring-loaded plurality of linkages that are constrained to rotate about parallel axes. With the exception of a protruding lever that is gripped by the pilot, the moving parts of preferred embodiment 11 are contained within housing 13.

Housing 13 is rigidly attached to top end 14 of control stick 12. Housing 13 includes side cover plate 15. Side cover plate 15 is removed in FIGS. 2 and 3 in order to show the moving parts of preferred embodiment 11. Arm 16 is rotatively attached to housing 13 at pivot 17. Grip 19 is fastened to the end of arm 16 that protrudes from housing 13, and is gripped by the pilot. The other end of arm 16 is rotatively attached to link 21 at point 23. Link 21 is also rotatively attached to bellcrank 25 at point 27.

Bellcrank 25 is rotatively attached to housing 13 at pivot 29. Bell crank 25 is also rotatively attached to spring cartridge 31 at point 33. Spring cartridge 31 is rotatively attached to housing 13 at pivot 35. Spring cartridge 31 holds spring 37 in compression so that a load is applied to bell crank 25 at point 33. Scissors linkage 38 is rotatively attached to arm 16 at point 39 and is also rotatively attached to housing 13 at pivot 40.

Scissors linkage 38 prevents point 23 from being laterally translated by either a lateral force applied at grip 19 or an inertial force.

Switch 41 is comprised of sphere 42, piston 43 and switch casing 45. Sphere 42 rests in a cupped depression on the top of piston 43, and is rotatively attached to piston 43 by a bracket (not shown). Piston 43 slidably projects from switch casing 45, and is spring loaded to resist being depressed into switch casing 45. Switch 41 is closed by depressing piston 43 partially into switch casing 45. Switch 41 is rigidly attached to arm 16 by bracket 46, and is electrically connected to a g-limiter override circuit located in flight control computer 47 (as indicated in the schematic diagram comprising FIG. 6). When switch 41 is closed, the g-limiter override is actuated. Paddle 48 is rotatively attached to housing 13 at pivot 49. Paddle 48 is free to rotate only in a clockwise direction, that is, towards housing 13 and in the direction that will close switch 41. Rotation of paddle 48 in a counterclockwise direction is prevented by paddle stop 51. Paddle stop 51 and the abutting section of paddle 48 are sectioned in FIG. 1 to facilitate a better understanding of their operative interaction. Actuation of the g-limiter override can be affected by the application of pressure to paddle 48 by the fifth digit (pinky finger) of the pilot's hand that is otherwise gripping grip 19, or by a digit on the pilot's other hand. As will subsequently be described in greater detail, switch 41 may also be closed by being forced upwards into paddle 48 by the clockwise rotation of arm 16 about pivot 17.

Figure 6:
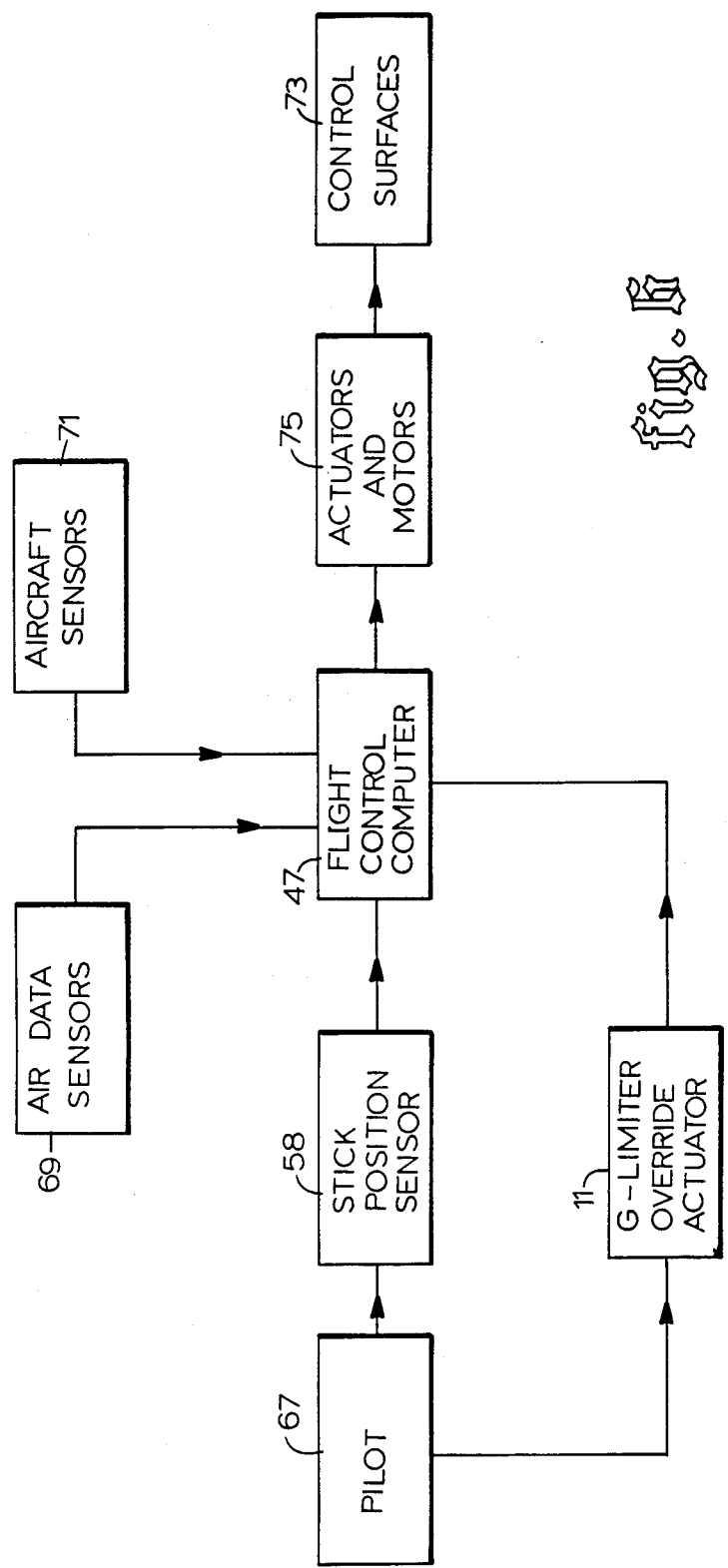
FIG. 6 is a schematic diagram of an aircraft control system which includes a g-limiter override actuated by the preferred embodiment of the present invention.

As best understood by referring to FIG. 1, control stick 12 includes top end 14 and bottom end 55. Control stick 12 rotates about pivot 56, which is located between top end 14 and bottom end 55. Pivot 56 is rigidly attached to frame 57 of the aircraft. Stick position sensor 58 is a linear variable differential transformer which is rotatively connected to bottom end 55 by linkage 59, and generates an electrical signal responsive to the angular position of control stick 12. As schematically shown in FIG. 6, the stick position signal emanating from stick position sensor 58 is input into flight control computer 47.

Stick stops 61 and 62 limit the longitudinal travel of control stick 12 by constraining the rotation of bottom end 55. The maximum clockwise longitudinal travel of top end 14 of control stick 12, "full aft stick", is obtained when the pilot pulls top end 14 towards him until bottom end 55 abuts stick stop 61. Feel springs 66 are located between and attached to control stick 12 and stick stops 61 and 62, respectively. Feel springs 66 control the resisting force that must be overcome by the pilot at grip 19 in order to move grip 19 from neutral stick to full aft stick.

There are particular steady state flight situations where full aft stick will not command the aircraft's maximum normal g's, for example, during landings and take-offs. However, although there may be a time lag, full aft stick typically commands the aircraft's maximum normal g's (provided the dynamic pressure is sufficiently high), and in such a situation the g-limiter operates to prevent the pilot from commanding normal g's that might exceed the stress that he can withstand or cause structural loading in excess of the design limit load of the aircraft. In full aft stick the force applied by the pilot to top end 14 of control stick 12 through grip 19 is transmitted into preferred embodiment 11 by arm 16.

Figure 4:
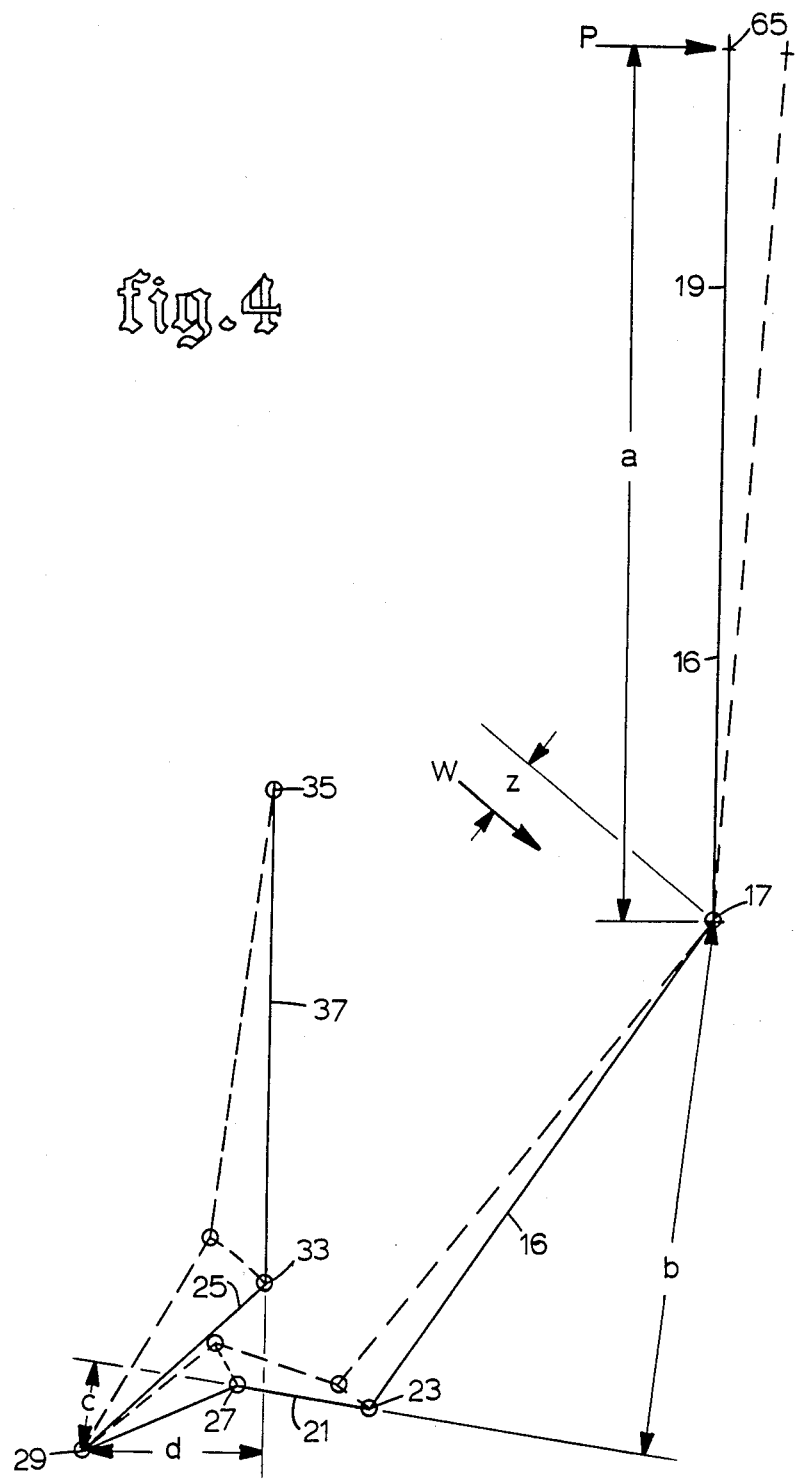
FIG. 4 is a schematic diagram of the preferred embodiment of the present invention.

A schematic diagram of preferred embodiment 11 is shown in FIG. 4. The elements shown in FIGS. 2 and 3 are schematically represented in FIG. 4 in order to facilitate analysis, and the reference numerals used in FIGS. 2 and 3 have been retained.

Assuming a static situation and a full aft stick position for control stick 12, summing the moments about pivot 17 results in the following equation:

$$Pa = Lb + Wz \qquad (1)$$

wherein:
P is the force applied by the pilot at point 65 on grip 19 in order to to maintain a given displacement of grip 19 from neutral stick (P is positive in the direction necessary to obtain a clockwise rotation of grip 19);
L is the reaction force resulting from the compression of link 21;
W is the reaction force by paddle 48 against switch 41;
a is the moment arm of P about pivot 17;
b is the moment arm of L about pivot 17; and
z is the moment of W about pivot 17.

Summing the moments about pivot 29:

$$Sd = Lc \qquad (2)$$

wherein:
S is the spring force resulting from the compression of spring 37;
c is the moment arm of L about pivot 29; and
d is the moment arm of S about pivot 29.

Solving equation (2) for L and substituting into equation (1), then solving equation (1) for P:

$$P = \frac{Sbd}{ac} + \frac{Wz}{a} \qquad (3)$$

The switch reaction term is comparatively negligible and can be ignored. Equation (3) can thus be rewritten as follows:

$$P = S\left(\frac{bd}{ac}\right) \qquad (4)$$

As changes in a and b are comparatively negligible for the operative travel of arm 16, they can be treated as constants, leaving S, c and d as the only parameters that vary as functions of the rotation of arm 16 about pivot 17. More particularly, when P reaches the threshold level necessary to overcome the opposing S, that is, the spring break-out force, arm 16 rotates clockwise about pivot 17. This motion further compresses spring 37 and causes an increase in S. However, the concomitant increase in c and decrease in d due to the accompanying counterclockwise rotation of bell crank 25 about pivot 29 more than offset the increase in S, with the net effect being a decrease in P as soon as P reaches the spring break-out force. In other words, the force required to rotate arm 16 will sharply decrease after it reaches an initial, predetermined level.

The clockwise rotation of arm 16 about pivot 17 forces switch 41 upwards into paddle 48. As paddle 48 is prevented by paddle stop 51 from rotating counterclockwise from its pictured, undepressed position, the upward translation of switch 41 into paddle 48 pushes piston 43 into switch casing 45, thereby closing switch 41 and actuating the g-limiter override. The clockwise rotation of arm 16 is limited by bell crank 25 abutting bell crank stop 63.

Figure 5:
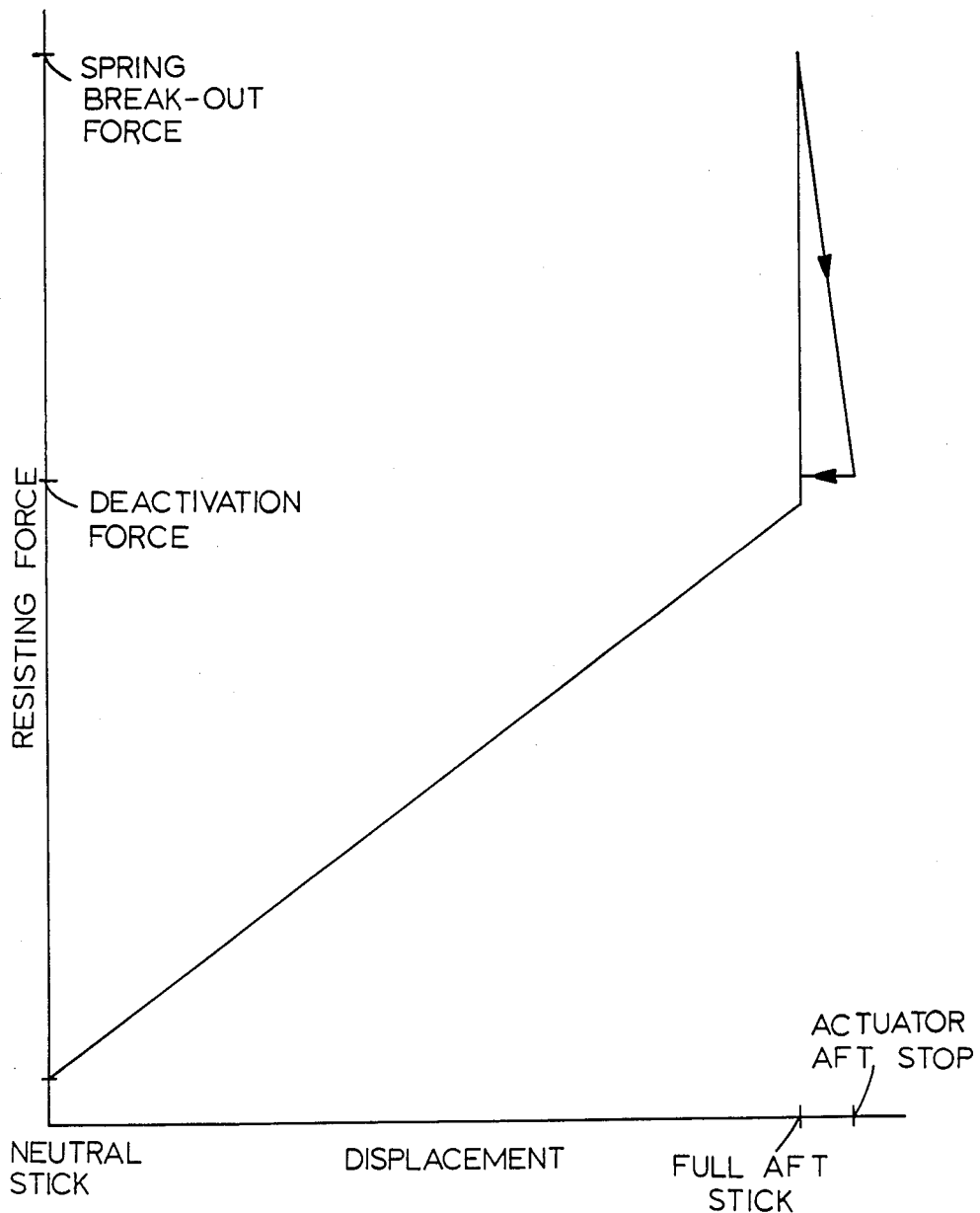
FIG. 5 is a graph of the resisting force generated by the preferred embodiment of the present invention versus the displacement of the control stick.

The operative effect of preferred embodiment 11 can be understood by referring to FIG. 5, a plot of the resisting force applied against grip 19 versus the displacement of grip 19. When control stick 12 is pulled into its full aft position, further movement of grip 19 can only be obtained by increasing the force applied to grip 19 until it equals or exceeds the spring break-out force of preferred embodiment 11. When the force applied at grip 19 equals the spring break-out force, the resisting force opposing the rotation of grip 19 about pivot 17 sharply decreases. Since the force being applied at grip 19 is still at least equal to the spring break-out force, the result is a sudden, distinct movement of grip 19 about pivot 17 from its position at full aft stick to the position shown in FIG. 3 obtained by rotating bell crank 25 into abutment with bell crank stop 63, that is, the "actuator aft stop" position. The sudden, distinct displacement of grip 19 provides a tactile signal to the pilot that the g-limiter override has been actuated.

To keep the g-limiter override engaged, the force applied at grip 19 must continually generate a counterclockwise moment about pivot 29 which equals or exceeds the resisting clockwise deactivation moment generated by the spring force S acting at the moment arm d when bellcrank 25 abuts bell crank stop 63. As indicated in FIG. 5, this deactivation force is slightly greater than the resisting force that must be overcome in order to obtain full aft stick. Thus, maintaining actuation of the g-limiter override will not unduly tire the pilot, nor will it hinder him from laterally moving the stick to execute roll maneuvers.

When the force applied to grip 19 drops below the deactivation force, grip 19 will suddenly move in a counterclockwise direction until arm 16 abuts arm stop 64 and grip 19 is returned to full aft stick (shown in FIG. 2). The sudden, discrete motion is due to a rapid increase in the deactivation moment, primarily affected by an increase in moment arm d in conjunction with a decrease in moment arm c. The sudden counterclockwise movement of grip 19 provides the pilot with a tactile signal that the g-limiter override is no longer operating. The relationship between the resisting force applied to grip 19 and the displacement of grip 19 is then again provided by feel springs 66.

The relationship between preferred embodiment 11 and the other elements of the aircraft's flight control system is schematically illustrated in FIG. 6. The commands of pilot 67 are mechanically transmitted to stick position sensor 58 through his movement of control stick 12. Stick position sensor 58 is a linear variable differential transformer which emits voltages responsive to the respective positions of control stick 12. The electrical output of stick position sensor 58 is received by flight control computer 47.

To give effect to his desire to override the g-limiter, pilot 67 must pull on grip 19 with a force equal to or greater than the spring break-out force while control stick 12 is at full aft stick. (Alternatively, he can pull on paddle 48.) Preferred embodiment 11 then translates the mechanical force of pilot 67 into an electrical signal which is input into flight control computer 47 and actuates the g-limiter override circuitry contained therein. Preferred embodiment 11 thus effectively bypasses stick position sensor 58 when actuated, and is quiescent at all other times. Air data sensors 69 and aircraft sensors 71 also provide data input into and used by flight control computer 47. Air data sensors 69 sense the total pressure and the static pressure acting on the aircraft, and use this data to determine airspeed, altitude, Mach number and rate of climb. Aircraft sensors 71 are comprised of accelerometers and rate gyros. The accelerometers determine the normal acceleration components of the aircraft, while the rate gyros determine the aircraft's rates of pitch, roll and yaw. (Flight control systems typically include a feedback loop between the aircraft sensors and the flight control computer. A feedback loop is not shown here due to the limited purpose of this diagram and discussion.)

Based on its received inputs, flight control computer 47 calculates the appropriate deflections for control surfaces 73 and sends digital signals to actuators and motors 75. Actuators and motors 75 translate the signals received from flight control computer 47 into mechanical deflections of control surfaces 73.

Preferred embodiment 11 was installed on a flight control system which required 35 pounds of force to pull grip 19 to full aft stick. The following dimensions provided a spring break-out force of 70 pounds; an override deactivation force of 37 pounds; and a displacement at location 65 on grip 19 upon actuation and deactivation of the g-limiter override, respectively, of ⅜ of an inch (which was found to provide a discernable tactile signal):

straight line distance between location 65 and pivot 17 of 5.651";

straight line distance between pivot 17 and point 23 of 3.873";

straight line distance between point 23 and point 27 of 0.877";

straight line distance between point 27 and pivot 29 of 1.120";

straight line distance between pivot 29 and point 33 of 1.632";

straight line distance between point 33 and pivot 35 of 3.202;

spring constant of spring 37 equal to 97.88 pounds per inch; and compression of spring 37 providing a pre-loading of 55.19 pounds.

The following table indicates the changes in the noted parameters that resulted from the actuation of preferred embodiment 11.

|  | a | b | c | d | distance from point 33 to pivot 35 | S |
|---|---|---|---|---|---|---|
| unactuated | 5.651" | 3.490" | .594" | 1.220" | 3.202" | 55.19 pounds |
| actuated | 5.651" | 3.624" | .951" | .656" | 2.913" | 83.10 pounds |

Changes and modifications in the specifically described embodiment can be carried out without departing from the scope of the invention, which is intended to be limited only by the scope of the appended claims.

We claim:

1. An apparatus for overriding a control stick limiter comprising:
   a control stick having its travel restricted by a stop;
   an arm attached to said control stick and rotating relative to said control stick when said control stick is restrained by said stop;
   means for overriding said control stick limiter, said override means being actuated upon the rotation of said arm from an initial position through a predetermined angle with respect to said control stick; and
   means attached to said arm for resisting the rotation of said arm relative to said control stick, said resisting means preventing the rotation of said arm relative to said control stick until a break-out force is applied to said arm, whereupon said resistance is decreased; whereby
   the application of said break-out force to said arm causes the sudden rotation of said arm through said angle and signals the actuation of said override means.

2. The apparatus for overriding a control stick limiter defined in claim 1 wherein:
   said resisting means applies a deactivation force against said arm while said arm is located at said predetermined angle; and
   said deactivation force tending to return said arm to said initial position, with the force that must be applied to said arm in order to keep said arm at said angle being less than said break-out force; whereby
   the actuation of said override means can be maintained by the continuous application to said arm of a force less than said break-out force.

3. The apparatus for overriding a control stick limiter defined in claim 2 wherein:
   when the force applied to said arm drops below said deactivation force, said resisting means forces said arm to return to said initial position and increases said resistance back to a level which can only be overcome by the application to said arm of a force at least equal to said break-out force; whereupon
   said override means is deactivated; whereby
   the deactivation of said override means is signaled.

4. The apparatus for overriding a control stick limiter defined in claim 3 further comprising:
   a housing attached to said control stick;
   said arm being rotatively attached to said housing;
   said resisting means being comprised of a spring-loaded linkage; and
   said linkage being rotatively attached to said arm and being rotatively mounted within said housing.

5. The apparatus for overriding a control stick limiter defined in claim 4 wherein said linkage is comprised of:
   a link rotatively attached to said arm;
   a bell crank rotatively attached to said link and rotatively attached to said housing at a bell crank pivot; and
   a spring having a first end rotatively attached to said bell crank and a second end rotatively attached to said housing.

6. The apparatus for overriding a control stick limiter defined in claim 5 wherein:
   said spring is pre-loaded and generates a resisting moment about said bell crank pivot which is translated into said resistance;
   said linkage translating said break-out force into a break-out moment against said bell crank about said bell crank pivot in the opposite direction of said resisting moment; and
   said break-out moment being greater than said resisting moment and causing the rotation of said bell crank in a direction which decreases said resisting moment and increases said break-out moment.

7. The apparatus for overriding a control stick limiter defined in claim 6 wherein:
said arm has a grip end and a connecting end;
said connecting end being rotatively attached to said link and said grip end being gripped by an operator; and
said arm being rotatively attached to said housing between said grip end and said connecting end; whereby
the actuation and deactivation of said override means causes said operator to receive tactile signals, respectively, through said grip end.

8. The apparatus for overriding a control stick limiter defined in claim 7 wherein:
said arm, said link, said bell crank, and said first end and said second end of said spring rotate about parallel axes.

9. The apparatus for overriding a control stick limiter defined in claim 8 wherein:
said control stick controls the flight of a flight vehicle; and
said control stick limiter limits the normal acceleration which said control stick can command.

10. An apparatus for overriding a control stick limiter responsive to a predetermined parameter comprising:
a linkage comprised of a plurality of rotatively connected members, with one of said members being an arm;
said linkage being located in and rotatively attached to a housing;
said housing being fixedly attached to a control stick;
means for overriding said control stick limiter which is actuated upon the travel of said arm relative to said control stick from an initial position through a predetermined angle; and
said linkage generating a variable resisting force which prevents the travel of said arm relative to said control stick until a break-out force is applied to said arm, whereupon said resisting force is decreased; whereby
said override means is actuated upon the application of said break-out force to said arm.

11. The apparatus for overriding a control stick limiter defined in claim 10 wherein:
said linkage generates a deactivation force which tends to return said arm to said initial position from said angle and requires the application of at least a maintenance force to said arm in order to keep said arm at said angle; and
said maintenance force being less than said break-out force; whereby
said arm is kept at said angle and the actuation of said override means is maintained by the continuous application of at least said maintenance force to said arm and said arm is returned to said initial position and said override means is deactivated when the force applied to said arm drops below said maintenance force.

12. The apparatus for overriding a control stick limiter defined in claim 11 wherein:
when said arm is returned to said initial position, said linkage increases said resisting force back up to a level which can only be overcome by the application to said arm of a force at least equal to said break-out force.

13. The apparatus for overriding a control stick limiter defined in claim 12 wherein:
one end of said arm is a grip which projects from said housing;
an operator applies force to said arm through said grip; and
the travel of said arm through said angle results in a predetermined displacement of said grip; whereby
the actuation and the deactivation of said override means are respectively indicated to said operator by tactile signals received through said grip.

14. The apparatus for overriding a control stick limiter defined in claim 13 wherein:
said control stick controls the flight of a flight vehicle; and
said control stick limiter limits the normal acceleration which said control stick can command.

15. The apparatus for overriding a control stick limiter defined in claim 13 wherein:
said linkage is further comprised of a bell crank and a pre-loaded spring;
said bell crank rotating about a pivot on said housing;
one end of said spring being rotatively attached to said bellcrank and the other end of said spring being rotatively attached to said housing;
said spring generating a resisting moment against said bell crank about said pivot, which is translated into said resisting force by said linkage; and
said linkage translating said break-out force into a break-out moment acting against said bell crank about said pivot in a direction opposite that of said resisting moment, which is greater than said resisting moment and causes said bell crank to rotate in a direction which decreases said resisting moment and increases said break-out moment as said arm traverses said angle.

16. The apparatus for overriding a control stick limiter defined in claim 15 wherein:
said spring generates a deactivation moment against said bell crank about said pivot when said arm is at said angle, with said deactivation moment being translated into said deactivation force by said linkage; and
said deactivation moment tending to rotate said bell crank in a direction which increases said deactivation moment and decreases the moment translated by said linkage from the force applied at said grip.

17. The apparatus for overriding a control stick limiter defined in claim 16 wherein:
the application of at least said maintenance force to said grip is translated by said linkage into a maintenance moment against said bell crank about said pivot which prevents the rotation of said bell crank.

18. The apparatus for overriding a control stick limiter defined in claim 17 wherein:
said control stick controls the flight of a flight vehicle; and
said control stick limiter limits the normal acceleration which said control stick can command.

* * * * *